United States Patent [19]

Hart, Jr.

[11] Patent Number: 4,705,625
[45] Date of Patent: Nov. 10, 1987

[54] REVERSE OSMOSIS WATER PURIFYING SYSTEM

[76] Inventor: John E. Hart, Jr., 617 Eastview Rd., Largo, Fla. 33540

[21] Appl. No.: 793,198

[22] Filed: Oct. 31, 1985

[51] Int. Cl.[4] ............................................. B01D 13/00
[52] U.S. Cl. ................................ 210/110; 210/257.2; 210/321.72
[58] Field of Search ................. 210/257.2, 433.2, 101, 210/110, 117, 134, 136, 106

[56] References Cited

U.S. PATENT DOCUMENTS

| | | | |
|---|---|---|---|
| 3,493,496 | 2/1970 | Bray et al. | 210/257.2 |
| 3,542,199 | 11/1970 | Bray | 210/257.2 |
| 3,552,566 | 1/1971 | Lowe et al. | 210/134 |
| 3,726,793 | 4/1973 | Bray | 210/257.2 |
| 3,887,463 | 6/1975 | Bray | 210/257.2 |
| 4,021,343 | 5/1977 | Tyler | 210/134 |
| 4,086,166 | 4/1978 | Martin | 210/134 |
| 4,160,727 | 7/1979 | Harris, Jr. | 210/257.2 |
| 4,176,063 | 11/1979 | Tyler | 210/257.2 |
| 4,391,712 | 7/1983 | Tyler et al. | 210/257.2 |
| 4,482,456 | 11/1984 | Grayson | 210/257.2 |
| 4,585,554 | 4/1986 | Burrows | 210/433.2 |

*Primary Examiner*—Richard V. Fisher
*Assistant Examiner*—Linda S. Evans
*Attorney, Agent, or Firm*—Ronald E. Smith; Miguel A. Valdes

[57] ABSTRACT

A reverse osmosis (R.O.) water purifier system that collects and stores pure water at low pressure and dispenses it at high pressure. Impurities left behind when the water passes through a R.O. module are disposed of by two methods: the fast flush method and the slow flush method. In the fast flush method, water entering a R.O. module may take two paths to escape therefrom. The first path constrains it to travel through a semipermeable membrane in the module which filters out undissolved solids and which restrains the passage of dissolved liquids. The second path allows it to travel through the R.O. module, without passing through the membrane, thereby carrying out those impurities left behind by the water passing through the membrane. The purified water is directed to one side of a compartmented storage tank and the waste water from the module is directed to a control valve. From the control valve, the waste water may be directed through a restriction to a drain or it may be directed to the other compartment of the storage tank where the purified water is held. In the slow flush method, water enters a control valve, travels to the R.O. module, and has two paths of escape therefrom. The first path contrains it to go through the semi-permeable membrane in the R.O. module, and through a check valve to storage or outlet. The second path allows the water to escape through the R.O. module, thereby carrying to a drain the impurities left behind.

4 Claims, 17 Drawing Figures

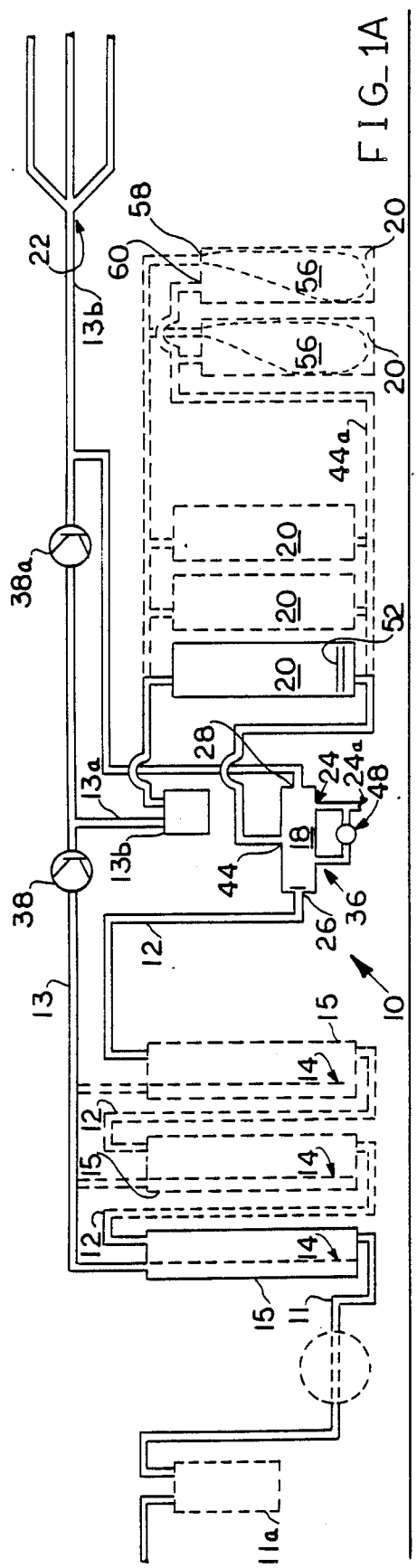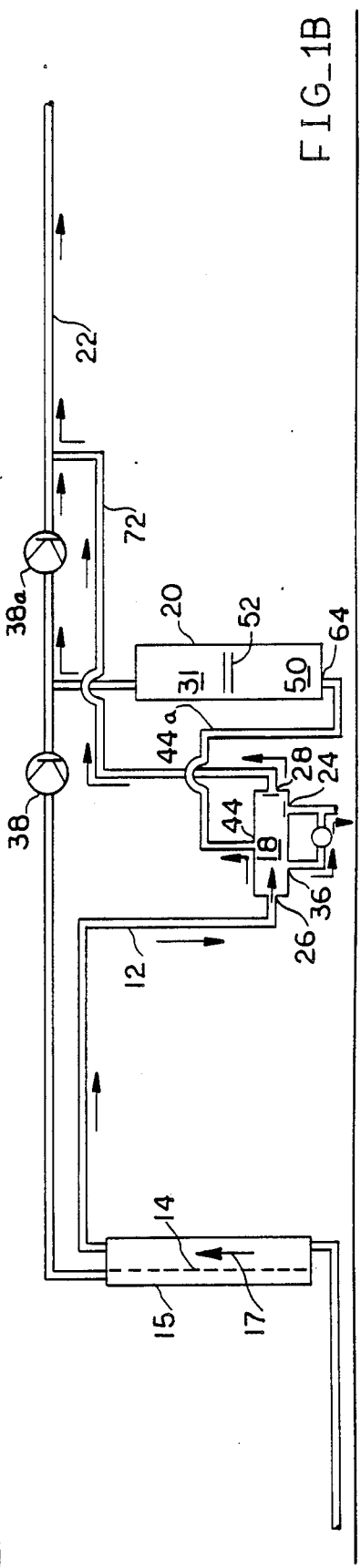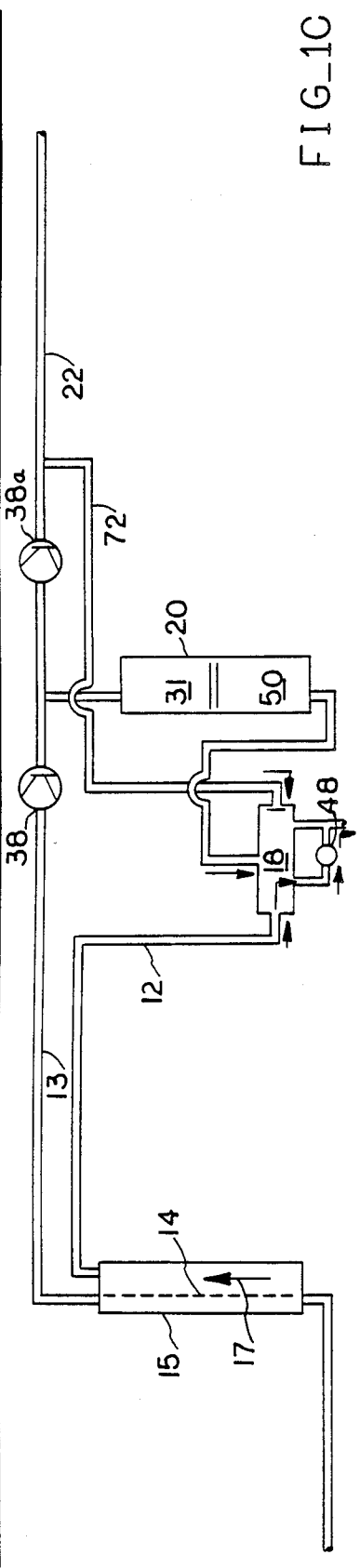

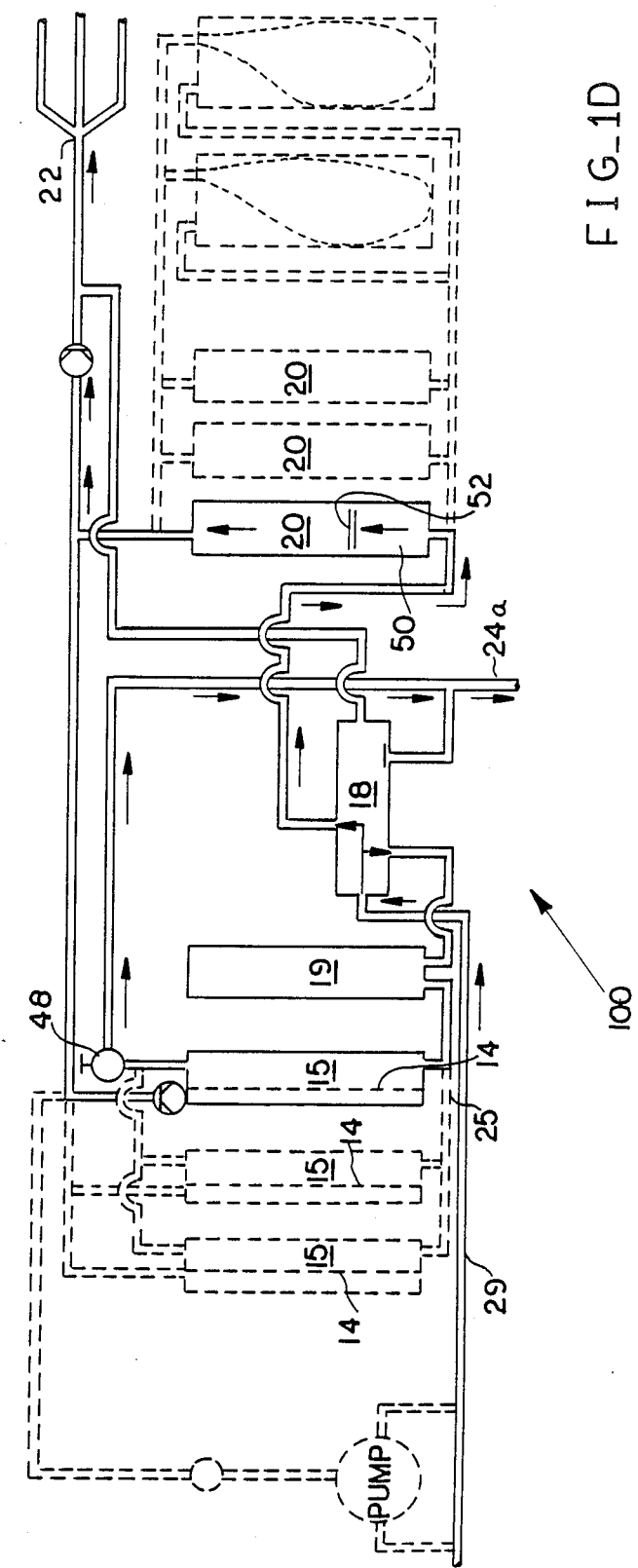
FIG_1D

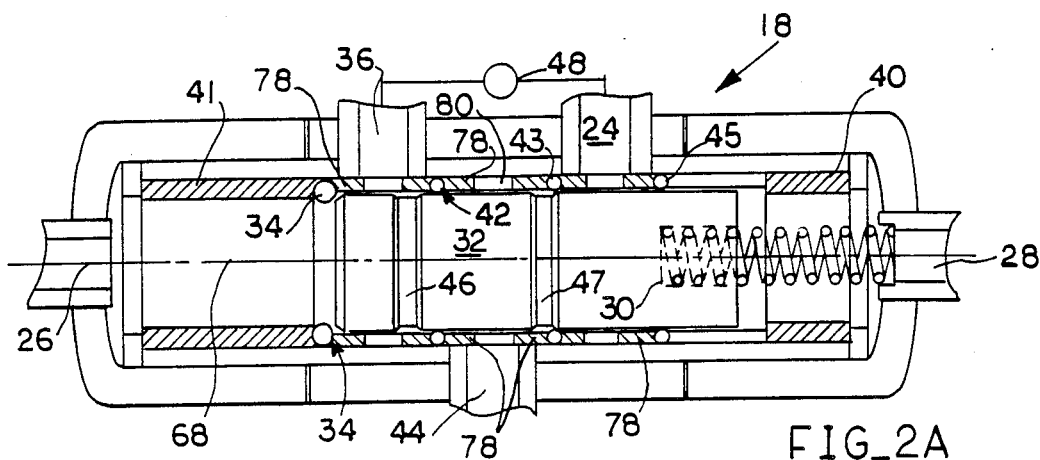
FIG_2A
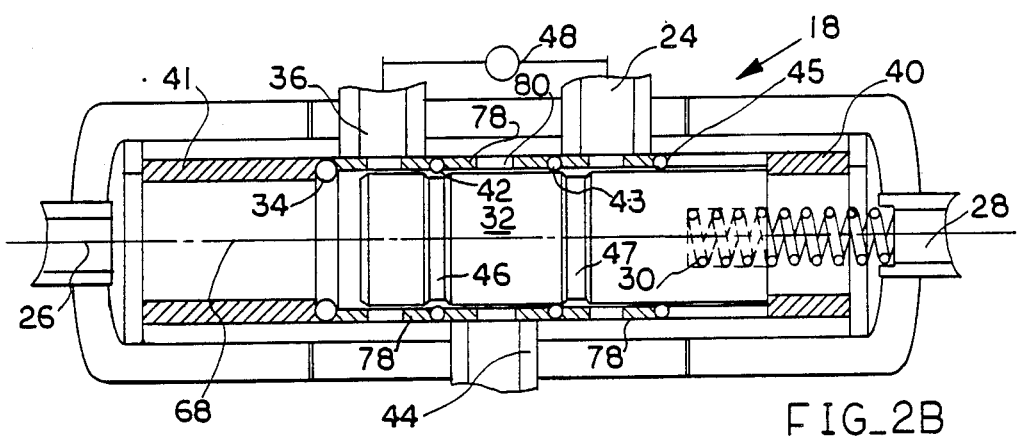
FIG_2B
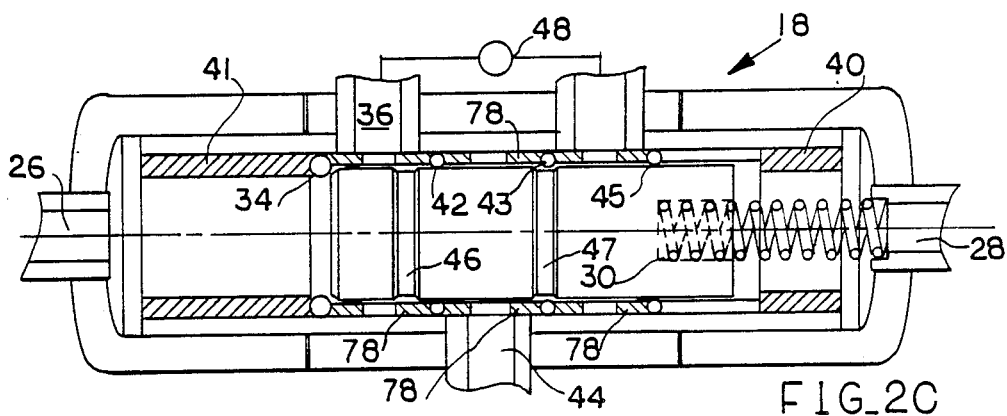
FIG_2C
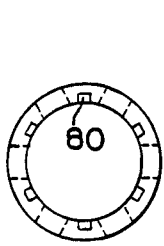
FIG_3A
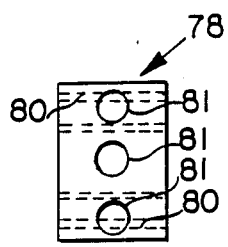
FIG_3B
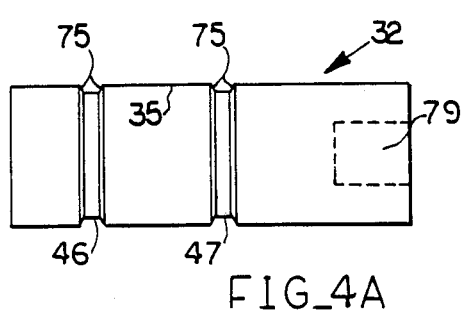
FIG_4A
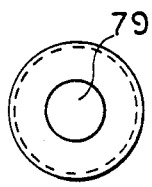
FIG_4B

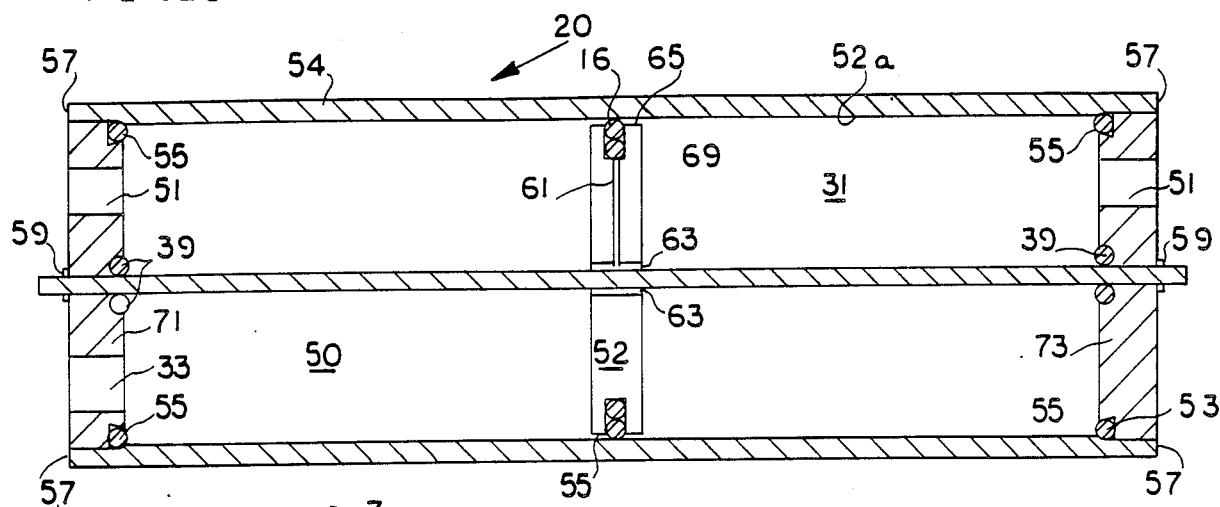
FIG_5
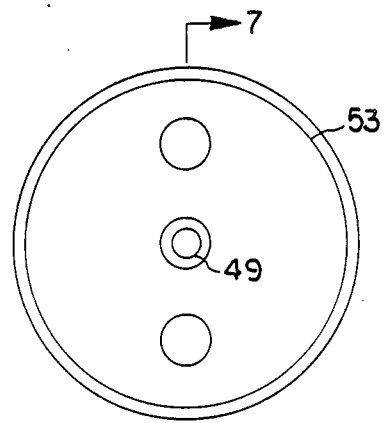
FIG_6
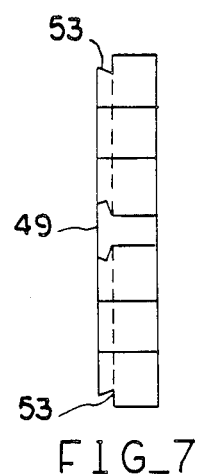
FIG_7
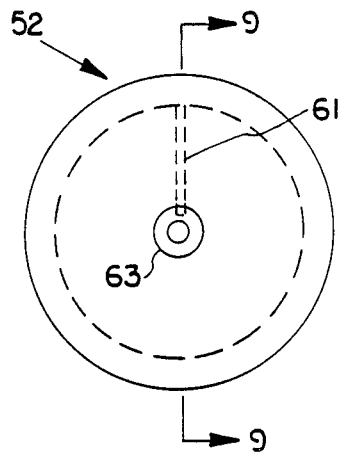
FIG_8
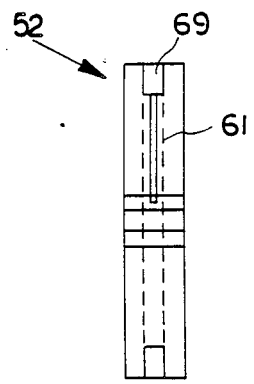
FIG_9

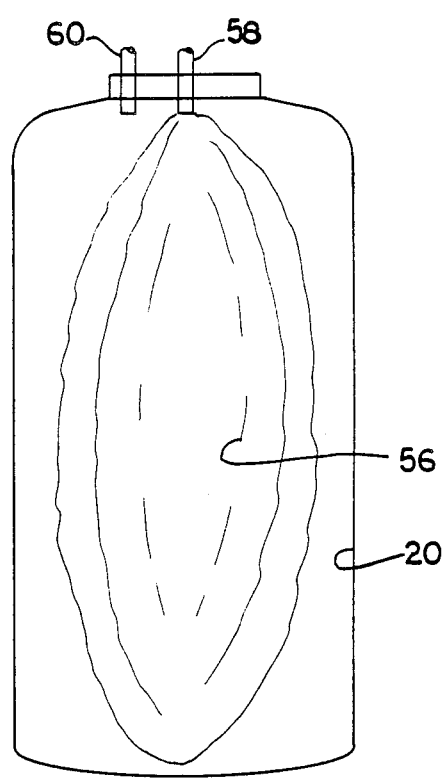
FIG_10

REVERSE OSMOSIS WATER PURIFYING SYSTEM

BACKGROUND OF THE INVENTION

1. Field of the Invention

This invention relates, generally, to a water purifying system, and more particularly relates to a reverse osmosis storage and recovery system for water purification.

2. Description of the Prior Art

Most reverse osmosis (R.O.) systems of the prior art fall into two categories: (1) those discharging product water (purified water) into an open container at atmospheric pressure, and (2) those discharging product water into a pressurized air cell tank.

The open discharge systems of category (1) are somewhat inconvenient to operate; moreover, the stored water is subject to air-borne contamination. These devices advantageously utilize total available pressure to drive water molecules through a semi-permeable R.O. membrane.

The devices of the second cateory include closed air cell tanks sealed against air-borne contamination. In these devices, however, air cell back pressure offsets incoming pressure and reduces the amount of driving force available. Consequently, both quality and quantity of product water suffer, particularly when water is drawn off and replaced in small quantities.

All R.O. systems waste a predetermined proportion of their product water production by discharging such quantity to a drain. The waste discharge carries away sediment and mineral salts leached from the product water. Unfortunately, most air cell storage systems, operating on line pressure, continually discharge the waste water even after the storage tank is filled. This results in a tremendous waste of water, shortens the life of pre-filters, and clogs waste constriction, all of which combine to cause system malfunction and concomitant customer dissatisfaction.

Examples of prior art systems are found in U.S. Pat. Nos. 3,493,496; 3,568,843; 3,542,199 and 3,726,793.

U.S. Pat. No. 3,887,463, issued June 3, 1975 to Bray, discloses an automatic valve operative to shut of all water to a R.O. system when pressure in an air cell tank reaches a predetermined pressure below incoming line pressure. The system is operative to turn on the water when pressure in the air cell tank falls below a predetermined pressure. Although this system shuts off waste water to a drain after the tank is filled, it does not prevent an increased back pressure in the air cell tank from lowering the available driving force across the R.O. membrane. It also sacrifices product water flow rate from the storage tank because of lower air cell tank back pressure. It does not have any means for automatically fast flushing the R.O. module.

U.S. Pat. No. 4,176,063, issued Nov. 27, 1979 to Tyler, discloses a R.O. system that fills a collapsible bag within a tank (squeeze tank) at a reduced back pressure. It discharges product water at near line pressure and shuts off water to the R.O. module when the tank is full. This is accomplished with a complex series of diaphragm valves. Although this prior art device accomplishes its basic objectives, it still has several shortcomings. A constriction between the waste side of the squeeze tank and the drain creates back pressure on the squeeze tank; moreover, the drain creates back pressure on the squeeze tank waste water and purified water during the filling, thereby decreasing product quantity and quality. A complex plumbing circuit and a plurality of diaphragm valves also combine to restrict product water flow when dispensing.

There is a growing need for a simpler, more effective and less expensive R.O. water purifier system.

It is the primary object of this invention to provide a water purification system of elegant design.

Another object of this invention is to provide a water purification system having a superior product water dispensing flow rate vis a vis the flow rates of prior art devices, and to provide a system having less back pressure on its storage tank when filling.

Still another object of this invention is to provide a water purification system which is less expensive to manufacture and to maintain than the systems of the prior art.

SUMMARY OF THE INVENTION

This invention accomplishes these and other objects by providing a reverse osmosis storage and recovery system for water purification that comprises a reverse osmosis module, an automatic hydraulic control valve and a sealed positive displacement water storage tank.

With respect to the disposal of the impurities left behind by the water passing through a membrane in the R.O. module, this system is classified in two types: (1) fast flush and (2) slow flush.

In the fast flush type, the system makes and stores R.O. product water at low pressure and dispenses it at a higher pressure. The system shuts off when the storage tank is full and fast flushes the R.O. module every time product water is drawn by the consumer. Driving pressure can be increased with a booster pump; moreover, the capacity of the system can be further increased by adding additional R.O. modules and storage tanks.

Product water pressure is trapped by a check valve in an outlet circuit above (up-stream of) the storage tank, but ahead of the closed dispensing faucet or valve. A pressure drop occurs in this trapped area when a product water faucet is opened by a consumer or when a refrigerator valve is automatically opened to make ice. The pressure drop activates a control valve that directs the flow of waste water from the R.O. module to the waste water area of the storage tank. In this tank, waste (unpurified) water is separated from product (purified) water by a moveable piston in a first embodiment or by a collapsible non-permeable bag within a pressure vessel in a second embodiment.

Product water in the storage tank is discharged therefrom, during the dispensing process, by a piston which moves responsive to pressure from the unpurified water at the waste water side of the R.O. module in the first embodiment, or responsive to the squeezing of the collapsible non-permeable bag within a pressure vessel in the second embodiment. During this dispensing process, the waste side of the R.O. module is fast flushed by the increased flow of waste water to the waste side of the storage tank. When the product water outlet of the storage tank is closed, as when the dispensing process has been completed, pressure is partially restored in the trapped outlet circuit. Further restoration of pressure in the trapped outlet circuit occurs through the membrane of the R.O. module. This pressure actuates the control valve to connect the waste water side of the storage tank to drain and to disconnect it from the waste water of the module. This allows product water in the storage tank to displace waste water therefrom at relatively low pressure, thereby maintaining maximum mineral rejection during product water recovery.

The control valve directs waste water to drain through an adjustable needle valve during the dispensing and recouping processes. This provides a slow flush of the R.O. module while product water is being collected.

Water pressure inside the storage tank rises to line (or incoming) pressure when product water has displaced all waste water in the storage tank, i.e., when the storage tank is full. This elevates pressure in the trapped outlet circuit, and causes the control valve to close the waste water to the slow flush needle valve, thereby cutting off all flow of water through the system.

The slow flush or third embodiment uses the same elements of the fast flush embodiment summarized above. However, source water is first directed to the control valve, to prefilters and then to the R.O. modules. This shuts off water ahead of major components when the storage tank is full of product water, thereby depressurizing the system when the storage is full. This third embodiment of the invention functions in a manner substantially similar to the fast flush embodiment except that the R.O. valve is ahead of the prefilter and R.O. module.

The system provides several significant features and advantages. The small size of the storage tank provides a compact unit which is ideal for domestic under sink and small commerical installations, such as for water vending machines and restaurants. The storage tank can be made with an extra port at the waste water end of the tank. When this port is connected to pressure, while the other waste water port is connected to drain, a circulation is created within the waste water side of the tank. This flushes solid debris out of the tank without disassembly.

A further advantage is that this water purifier system requires fewer valves and less piping than other systems. Consequently, the design is simpler and less expensive to manufacture and maintain vis a vis the prior art systems.

The control valve of this invention is designed to be fabricated from inexpensive thermoplastic stock shapes with a minimum of machining and fabrication. Certain parts can be injection molded to minimize mass production cost. Moreover, the piston type storage tank is designed to use stock extruded thermoplastic tube.

The slow flush type system may be used where it is desirable to minimize the flow rate through carbon prefilters, thereby allowing longer contact time. This system also eliminates the need to prefilter product displacement water. It also minimizes the chances for leaks since the system is depressurized when at rest.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1A is a schematic diagram of the novel fast flush R.O. water purifier system in its at-rest position;

FIG. 1B is a schematic diagram of the fast flush R.O. water purifier system in its dispensing mode;

FIG. 1C is a schematic diagram of the fast flush R.O. water purifier system in its recouping mode;

FIG. 1D is a schematic diagram of the slow flush R.O. water purifier system in its dispensing position;

FIG. 2A is a sectional view of the control valve of the R.O. water purifier system in its at rest position;

FIG. 2B is a sectional view of the control valve in its dispensing mode;

FIG. 2C is a sectional view of the control valve in its recouping mode;

FIG. 3A is an end view of the control valve spacer ring of the invention;

FIG. 3B is a side elevational view of the spacer ring of FIG. 3A;

FIG. 4A is a side elevational view of the control valve piston of the R.O. water purifier system;

FIG. 4B is an end view of the piston shown in FIG. 4A;

FIG. 5 is a longitudinal sectional view of the novel storage tank;

FIG. 6 is an end view of a storage tank end plug;

FIG. 7 is a sectional view of the plug of FIG. 6 taken along line 7—7 in FIG. 6.

FIG. 8 is an end view of the storage tank piston;

FIG. 9 is a sectional view of the piston along line 9—9 of FIG. 8; and

FIG. 10 is a sectional view of a collapsible positive displacement tank.

Similar reference numerals refer to similar parts throughout the several views of the drawings.

DETAILED DESCRIPTION OF THE PREFERRED EMBODIMENT

Referring now to FIG. 1A, it will there be seen that a first embodiment of the invention is a R.O., fast flush water purifying system; it is designated by the reference numeral 10 as a whole.

The novel device 10 will be described, initially, in its at rest mode.

Pressurized water is supplied to one or more R.O. modules, collectively designated 15, through line 11; a pre-filter 11a may be employed to remove particulate matter and/or to alter water chemically for better R.O. efficiency. To exit a module 15, the water must pass through either a membrane 14, which passage purifies the water as the membrane is closed to impurities, or through conduit 12 which latter passage has no effect on water purity.

Purified water, hereinafter sometimes referred to as product water, may exit modules 15 and travel to storage tanks 20 via lines 13 and 13a, passing through an optional post-filter means 13b, or in the alternative, may travel to a pure water outlet 22, as shown. Check valves 38 and 38a prevent reverse flow.

When system 10 is at rest, no water flows therethrough and all components of the system are basically at incoming water pressure except for tubing 24a to drain port 24.

Referring now to FIG. 2A, wherein control valve 18 is shown in detail, it should be understood that control port 28 and waste port 26 are nearly at the same pressure when the system 10 is in its at rest mode. It should also be noted that waste port 26 is the inlet for valve 18 and that bleed port 36 and storage port 44 are the outlets. Control port 28 is isolated, fluidically, from all other valves and is connected to the product water outlet(s). At rest, pressure at control port 28 is slightly less than the pressure at waste port 26.

A bias means, in the form of a coil spring 30, maintains piston 32 in abutting relation to O ring 34 when the system is at rest, i.e., when the storage tanks 20 are full and water pressure is nearly equal on each end face of valve piston 32. The abutment of piston 32 and O ring 34 seals waste port 26 which prevents water from entering valve 18, and closes bleed port 36 as well. O ring 34 has a larger cross section than the other O rings employed in the inventive device, as depicted in the FIGS., because it serves as a bumper means against which piston 32 is pressed as aforesaid.

System 10 will now be described in its dispensing mode; reference should therefore be made to FIGS. 1B and 2B.

The opening of pure water outlet 22 by a consumer opening a faucet or by a call for water made by a refrigerator ice maker causes a pressure drop in all components upstream of check valve 38a.

This pressure drop is communicated to the spring face of piston 32 in control valve 18. With full incoming water pressure on the opposite face of piston 32, the piston moves into an area of lower pressure thereby compressing spring 30 until its further travel is limited by annular stop 40. This piston travel is a left to right movement in the FIGS. The unseating of piston 32 from O ring 34 admits water into waste port 26 and hence into bleed port 36. The unseating of piston 32 also admits water into storage port 44 as O ring 42 aligns with annular groove 46 formed in piston 32, as is clearly depicted in FIG. 2B. Line 44a provides fluid communication between port 44 and the waste water side 50 of storage tanks 20, as shown in FIG. 1B. An adjustable pin valve 48 (FIG. 2A) screw threadedly engages bleed port 36 and externally connects to drain port 24. It is easily adjusted to vary the waste water volume in proportion to product water volume because product water recovery ratios vary with different source waters. The bleed valve 48 can be adjusted for internal cleaning of the R.O. modules by fast flushing. The restriction of this valve also pressurizes R.O. module 15 and allows waste water to flow past R.O membrane 14 as indicated by directional arrow 17 (FIGS. 1B and 1C) while other molecules of water are flowing through the membrane and thereby becoming purified.

A nonpermeable-to-water piston 52 is slideably mounted in storage tank 20 and is displaced by the waste water entering the tank through line 44a. Such piston displacement drives the product water in the product side 31 of tank 20 to outlet 22 as desired.

Piston 52 is shown in FIG. 5 in more detail. It is mounted for reciprocation within storage tank 20 on a metal rod 67 and is sealed against leakage by O ring seals 16.

FIG. 1A and FIG. 10 show a second, apistonal embodiment of tank 20 having a cylindrical, collapsible non-permeable to water plastic bag 56 therein. Port 58 is the mouth of bag 56 and is in fluid communication with pure water outlet 22. Port 60 admits waste water into the tank via line 44a, which admission compresses the bag and drives product water therein out port 58 to said outlet 22.

In the piston-type storage tank of FIG. 5, a slight pressure drop exists across piston 52 during the dispensing process due to the friction between O ring 16 and the inner cylindrical wall 54 of tank 20, and due to the resistance to movement of central bearing 63. Accordingly, the dispensing process precipitates a slight drop in pressure downstream of piston 52 in the product side 31 of tanks 20 to outlet 22, to the product water side of R.O. modules 15 and to port 28 of control valve 18.

Closing of pure water outlet 22 causes pressure to simultaneously build up at inlet 26 and outlet 28 of said control valve 18. However, a friction-induced pressure differential, caused by storage tank piston 52, exists across control valve piston 32. Therefore, full incoming pressure is exerted on waste side 50 of storage tank 20 and a slightly lower pressure is exerted on the product side 31 thereof. The same pressure differential across piston 52 exists across R.O. membrane 14 and ports 26 and 28 of control valve 18. Therefore, a small quantity of water leaks slowly through R.O. membrane 14, thereby causing an increase of pressure on the spring side of control valve piston 32.

FIGS. 1C and 2C depict the R.O. water purifying system in its recouping mode. Control valve piston 31 displaces from right to left when the pressure on the product side 32 of storage tank 20 increases to a point where this pressure, combined with the force of spring 30, exceeds incoming water pressure at inlet 11. Piston displacement continues until separation 35 of piston 32, which is formed between longitudinally spaced annular grooves 46 and 47, passes O rings 42 and 43 which isolate storage port 44. This closes the waste side 50 of storage tank 20 to further pressure and opens it to drain port 24, thereby communicating a sudden pressure drop through piston 52 to the product water side. This sudden loss of pressure does not appear in that part of the product water circuit beyond check valve 38.

However, the small amount of water displaced by piston 32 movement does slightly lower the pressure in circuit 72, thereby stopping movement of piston 32. Consequently, the piston movement from right to left as aforesaid will stop and start in repeating cycles until storage port 44 disconnects from waste port 26 and connects to drain at port 24. At this point, piston 32 stabilizes and moves no further because incoming pressure at port 26 is equal to the combined pressure of trapped circuit 72 at port 28 plus the force of bias spring 30.

Since piston surface 52a in tank 20 is relatively large, and since piston displacement is opposed by virtually no pressure at all, very little pressure, i.e., two or three pounds per square inch, is needed to move said piston.

Tank 20 fills slowly with product water during the recouping mode of device 10. Pure water outlet 22 may be opened at any stage of the recouping cycle, because the release of pressure in trapped circuit 72 produces a pressure differential across piston 32 which, in turn, causes it to return to the dispensing mode described hereinabove. Recouping resumes until tank 20 is full of product water and devoid of waste water.

Throughout the recouping cycle, R.O. module 15 continues to slowly supply product water into tank 20 until that product water displaces all waste water. At that point, piston 52 or collapsible bag 56 reaches the physical limit of its pressure vessel thereby causing product water pressure to go up to that of incoming pressure.

FIG. 2A shows control valve 18 in its at rest mode. Pressure on control port 28 of valve 18 increases after tank 20 is full of product water until, combined with the energy of spring 30 and the breakaway kinetic energy of O rings 42, 43 and 45, it displaces piston 32 so as to position said piston against large O ring 34 at waste port 26 of valve 18. This action shuts off the small flow of water to bleed port 36 and bleed valve 48. Water indicated by directional arrow 17 in FIGS. 1B and 1C ceases to wash by R.O. membrane 14 when bleed port 36 is closed. All flow through the purifier system is thereby stopped when tank 20 or bag 56 is filled.

Thus, maximum pressure differential across R.O. membrane 14 exists when the greatest quantity of product water is being made. This is highly desirable and results in the highest quality and quantity of product water. Incoming pressure is impressed upon product water during dispensing. Flow rate of product water is excellent due to the limited internal resistance of the novel apparatus. Moreover, R.O. module 15 is fast flushed and cleaned every time water is dispensed. The slow flush is easily adjusted for different recovery ratios a well, and the system shuts off when its storage tanks are filled.

O rings 34, 42, 43 and 45 are positioned in a plane normal to the longitudinal axis 68 of valve 32 by a plurality of spacer rings 78. FIGS. 3A and 3B show grooves 80 formed in spacer rings 78. These grooves, and clearance between the inside diameter of rings 78 and outside diameter of piston 32, allow water passage around said rings. These rings also have openings 81 formed in their sidewalls which allow the passage or water from adjacent ports in valve 18. The axial length of rings 78 determines the spacing between O rings 34, 42, 43 and 45.

Piston 32 stability is enhanced by a reciprocating piston phenomenon known as "break away resistance". Two or three times more energy is needed to start movement than to maintain movement. Although the "break away resistance" is relatively low in the inventive device because of the low friction characteristics of materials used, nonetheless, this resistance prevents piston drift caused by small, non-control pressure variations across piston surface 52a. It also creates a fast, snap action valving action.

FIG. 5 depicts a piston type storage tank 20 consisting of a tubular portion 54, end plugs 71 and 73 and piston 52. The ends of the cylinder are sealed by said end plugs which are secured one to the other by a metal tie rod 67. The ends of tie rod 67 are threaded and secured by nuts 59 so that all outward pressure against plugs 71 and 73 bears on the rod and nuts. Tie rod 67 also functions as a guide for piston 52.

Piston 52 accomodates two O rings 16 in annular groove 69. These rings are aligned concentrically to provide a maximum amount of squeeze, thereby assuring a good water seal against a possible irregular surface of tube 54. The outer ring has low friction characteristics and both rings are relatively soft to allow movement of piston 52 while O rings 16 are flexing.

Piston 52 is a disc that is guided down the center of portion 54 by tie rod 67. Rod 67 penetrates piston 52 through bushing 63. This bushing 63 is a smaller disc with a center aperture that compressively fits in piston 52 and rod 67. It is further secured by shear pin 61 which extends from the bottom of piston groove 69 to the bearing. The bearing is made of a self-lubricating thermoplastic material that is slightly compressed between the metal rod and the outer material of the piston. Accordingly, the bearing provides a water-tight seal between the piston and the rod. It holds the piston rigidly perpendicular to the rod, even when the piston is moving across an irregular surface. The bearing also lessens the friction between the piston and the rod.

Therefore, piston 52 is designed to reciprocate within an irregular shaped portion 54 with a minimum of friction and to do so in the absence of water leakage from one side to the other. Since the frictional resistance to piston movement is light and the surface area of the piston 52 is quite large, the pressure drop across the moving piston is low. However, when the piston reaches the end plug(s) and stops, the pressure differential across the piston goes up to incoming pressure. Since the moving piston O ring seals 16 are not as able to prevent a "blow by" at greater pressure differential, end plug O rings 55 and 39 intercept the piston when it reaches the plug and effectively prevent water from going around the piston.

End plugs 71 and 73 are sealed against tubular portion 54 by O rings 55. These O rings are positioned to project from the inside surface of the plugs as shown in FIG. 5. This is accomplished by an annular depression formed in the end of the tube which provides a seat for the plug, and an annular two-sided groove 53 on the inside edge of each plug. The projection of these end plug O rings stops the piston short of the end plug surface thereby providing a small space between the piston and the associated plugs 71 and 73 so that water entering tank 20 may exert its force against the entire piston face.

End plugs 71 and 73 are further sealed where the tie rod 67 extends through them by projecting O rings 39. To assure piston contact to both plug seals 55 and 39, the smaller center ring is designed to compress into the tapered bottom of slot 49 after the piston contacts outer O ring 55.

An optional second port 33 may be included in end plug 71 as shown in FIG. 5. Opening port 33 to drain during the dispensing cycle creates a circular flushing action in the waste water side of tank 20. This flushes out any solids that may have accumulated in the tank.

Another embodiment for a storage tank 20 is a nonpermeable collapsible bag positive displacement tank as depicted in a sectional drawing, FIG. 10. A cylindrically shaped collapsible bag 56, when inflated, substantially corresponds to the size and shape of storage tank 20.

Pure water enters port 58, thereby inflating bag 56 and dispelling waste water out of port 60, which is open to drain when the system is in its recouping mode (see FIG. 1C). When pure water is dispensing, as in FIG. 1B, waste water enters port 60, thereby exerting pressure on collapsible bag 56 and causing pure water to exit port 58 when open at a pure water outlet.

Reference is now made to now to FIG.. 1D which depicts a third embodiment of the invention in the form of a R.O., slow flush type, water purifying system which is designated by the reference numeral 100 as a whole. This novel device 100 will be described only in its dispensing mode. The valve postion is the same as in the first embodiment of the invention discussed above.

Water enters via line 29 to control valve 18 from which it is directed for necessary prefiltering at filter 19 via line 21 and thence to the R.O. module 15 via line 25. At this point, the water can escape by only two paths. The first path constrains it to go through semi-permeable membrane 14, then through check valve 27 to storage tanks 20 or to outlet 22. The second path allows the water to escape R.O. module 15 without penetrating membrane 14, thereby carrying out the impurities left behind. The second path is constrained by adjustable pin valve 48 causing a pressure drop across the valve to drain 24a. The control valve, reacting to a pressure drop at the pure water outlet 22 during the dispensing process, opens to water coming via line 29 to the waste side 50 of storage tank 20. Consequently, piston 52 moves and displaces product water out of tank 20 to outlet 22. This third embodiment does not fast flush R.O. module 15; however, it does not need to prefilter as much water as the first embodiment. This embodiment automatically shuts off water ahead of the components thereby depressurizing the system when storage tank 20 is full.

It will thus be seen the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention which, as a matter of language, might be said to fall therebetween.

Now that the invention has been described,
What is claimed is:

1. A reverse osmosis storage and recovery system for water purification, comprising:
   at least one R.O. module having a membrane dividing a cavity means of said R.O. module into a purified water cavity means and a waste water cavity means, said R.O. module operative to purify a predetermined proportion of water from an inlet means and to expel unpurified water as waste water
   at least one tubular in configuration container member for receiving, at a first end thereof, said purified water from said R.O. module during a recouping mode of said system, and for receiving, at a second end thereof, said waste water from said R.O. module, said waste water being under pressure and hence operative to expel said purified water from said container member during a dispensing mode of the system;
   drainage means for draining said waste water from said R.O. module to fast flush impurities therefrom, and for draining said waste water from said container member to allow said purified water to occupy said container member during the recouping mode of said system;
   a water outlet means to provide purified water to an outside recipient during the dispensing mode of the system;
   a cylindrical in configuration control means for controlling the circulation of water in the system by directing said purified water and said waste water during the recouping and dispensing modes and by stopping the circulation of said purified and waste water when the system is in an at rest mode;
   fluid communication means providing fluid communication between said R.O. module, said container member, said control means, said inlet means and said outlet means;
   closure means for closing opposite ends of said container member to provide a cavity means for containing said purified and waste water, said closure means including a first plug having a first port to receive or expel purified water, and a second plug having a second port to receive or expel waste water;
   a reciprocably mounted piston disposed transversely to said container member to isolate said purified water from said waste water inside said container member cavity means;
   a rod member disposed coincident with a longitudinal axis of said container member to tie together said first and second plug members, said rod member extending through a center of said piston so that said piston reciprocates longitudinally between said first and second plug members; and
   a waste water port means formed in a first end of said control means;
   a control port means formed in a second end of said control means;
   a storage port means formed in a sidewall of said control means;
   a bleed port means formed in a sidewall of said control means;
   a drain port means formed in a sidewall of said control means;
   a control means piston member slideably mounted interiorly of said control means, said piston member operative to isolate said waste water port means and said control port means from one another;
   a pair of spaced annular groove members formed in said control means piston member;
   and a plurality of O ring members for isolating said storage port means, said bleed port means, and said drain port means from one another unless an O ring member is aligned with an annular groove member so that reciprocation of said piston member selectively opens and closes said waste water port means, said control port means, said storage port means, said bleed port means and said drain port means individually and in a sequence that controls the operation of the system.

2. The R.O. storage and recovery system as recited in claim 1, further including a bias means that, in cooperation with pressure supplied by purified water, biases said piston member into an at rest position which closes all of said port means when said container member is filled with purified water.

3. In a reverse osmosis storage and recovery system including a R.O. module with a R.O. membrane therein, unpurified water being on an inlet side of said module and purified water on an opposite side thereof, said system including a container member having a slideably mounted piston member therein and said unpurified water being on opposite sides of said piston member, wherein the improvement comprises:
   a control means having a second slideably mounted piston member positioned therein;
   said control means having a first end in fluid communication with said unpurified water and having a second end in fluid communication with said purified water;
   a bias means positioned within said control means, said bias means and pressure of said purified water combining to urge said control means piston member into an at rest position when said container member is full of purified water
   the strength of said bias means being preselected so that said strength is insufficient to maintain said control means piston member in its at rest position when said container member is not full of purified water;
   whereby a call for service effects unseating of said control means piston member from its at rest position by reducing the pressure of said purified water within said control means;

whereby said unseating of said control means piston member effects circulation of water through said system;

whereby a call for service that empties said system of purified water is operative to fully compress said bias means and to thereby position said closure means piston member in a position opposite to its at rest position;

wherein said control means includes a storage port means positioned mid-length of said control means, a bleed port means and a drain port means formed in said control means in circumferentially spaced and flanking relation to said storage port means, a plurality of O ring members that isolate said port means from one another, and wherein said control means piston member is provided with means defining a pair of spaced annular grooves formed therein that selectively align with preselected O ring members to control the circulation of water through said control means responsive to changes in condition of said system.

4. A reverse osmosis storage and recovery system, comprising:

a R.O. module;

a storage container member;

said storage container member having a collapsible bag member therein that retains purified water from said R.O. module;

said storage container member having purified water therein that surrounds said bag member and which exerts a pressure thereagainst;

a control means that governs the circulation of purified and unpurified water through the system;

said control means having an inlet port means in fluid communication with unpurified water;

said control means having a control port means in fluid communication with purified water;

said control means having a slideably mounted piston member disposed therein which separates unpurified water from purified water;

said control means piston member biased by a mechanical bias means and by pressure of purified water into an at rest positon which closes the inlet and control port means of said control means when said bag member is full of purified water;

said bias means being preselected so that removal of purified water from said bag member effects displacement of said closure means piston member, which displacement opens said inlet and control port means of said control means;

said control means further comprising a storage port means, a bleed port means, and a drain port means the opening and closing of which is also effected by the reciprocation of said closure means piston member;

said closure means piston member including means defining a pair of longitudinally spaced annular grooves, wherein said closure means includes a plurality of O ring members, and wherein selective registration of said annular grooves and associated O ring members effects operation of said system.

* * * * *